(12) United States Patent
Hwang et al.

(10) Patent No.: US 10,780,589 B2
(45) Date of Patent: Sep. 22, 2020

(54) SHAPE COMPLIANT ELECTROADHESIVE GRIPPER

(71) Applicants: DAWOO FA Co., LTD, Chungcheongnam-do (KR); Daegu Gyeongbuk Institute of Science and Technology, Daegu (KR); Korea University Of Technology And Education Industry-University Cooperation Foundation, Chungcheongnam-do (KR)

(72) Inventors: Hae Sook Hwang, Daejeon (KR); Dong Won Yun, Daejeon (KR); Kyoung Bok Jin, Gyeonggi-do (KR); Sang Youn Kim, Seoul (KR)

(73) Assignees: DAWOO FA Co., LTD, Cheonan-si, Chungcheongnam-do (KR); Korea University of Technology and Education Industry-University Cooperation Foundation, Cheonan-si, Chungcheongnam-do (KR); Daegu Gyeonbuk Institute of Science and Technology, Daegu (KR)

( * ) Notice: Subject to any disclaimer, the term of this patent is extended or adjusted under 35 U.S.C. 154(b) by 0 days.

(21) Appl. No.: 16/400,138

(22) Filed: May 1, 2019

(65) Prior Publication Data

US 2020/0023527 A1    Jan. 23, 2020

(30) Foreign Application Priority Data

Jul. 20, 2018   (KR) .................. 10-2018-0084866

(51) Int. Cl.
*B25J 15/00* (2006.01)
*H02N 13/00* (2006.01)

(52) U.S. Cl.
CPC .......... *B25J 15/0085* (2013.01); *H02N 13/00* (2013.01)

(58) Field of Classification Search
CPC ... H02N 13/00; B25J 15/0009; B25J 15/0061; B25J 15/0085; B25J 15/12; B65G 47/92
(Continued)

(56) References Cited

U.S. PATENT DOCUMENTS 5,294,360 A * 3/1994 Carlson .............. C10M 171/001
                                          252/572
9,623,570 B1 * 4/2017 Krahn .................. B25J 15/0023
(Continued)

FOREIGN PATENT DOCUMENTS

JP        2010110846 A      5/2010

OTHER PUBLICATIONS

Kunquan Lu, et al., "The Electrorheological Fluids With High Shear Stress," International Journal of Modern Physics B, Dec. 31, 2005, vol. 19, Nos. 7, 8 & 9, pp. 1065-1070, World Scientific Publishing Company, Chinese Academy of Sciences, Beijing 100080, China.

*Primary Examiner* — Kevin J Comber
(74) *Attorney, Agent, or Firm* — Dinsmore & Shohl LLP; Yongsok Choi, Esq.

(57) ABSTRACT

Disclosed herein is a shape compliant electroadhesive gripper for picking up an atypical object. The shape compliant electroadhesive gripper comprises a body, and an electroadhesive module disposed on the body and including an electrorheological elastomer, wherein, when a voltage is not applied, a shape of the electroadhesive module is deformed according to a shape of an external object coming into contact with the electroadhesive module, and when the voltage is applied, rigidity of the electrorheological elastomer is increased to maintain the shape of the electroadhesive module, and when the voltage is applied to the electroad-
(Continued)

hesive module, electroadhesion is made due to an electrostatic force generated between the electrorheological elastomer and the adjacent external object.

6 Claims, 7 Drawing Sheets

(58) Field of Classification Search
USPC .......................................................... 361/234
See application file for complete search history.

(56) References Cited

U.S. PATENT DOCUMENTS

| | | | |
|---|---|---|---|
| 2013/0106127 A1* | 5/2013 | Lipson | B25J 15/12 |
| | | | 294/189 |
| 2014/0035306 A1* | 2/2014 | Garcia | B25J 15/0009 |
| | | | 294/213 |
| 2015/0298320 A1* | 10/2015 | Eisele | B25J 15/0071 |
| | | | 294/24 |

* cited by examiner

SHAPE COMPLIANT ELECTROADHESIVE GRIPPER

CROSS-REFERENCE TO RELATED APPLICATION

This application claims priority to and the benefit of Korean Patent Application No. 2018-0084866, filed on Jul. 20, 2018, the disclosure of which is incorporated herein by reference in its entirety.

FIELD OF THE INVENTION

The present disclosure relates to a shape compliant electroadhesive gripper, and more particularly to, a shape compliant electroadhesive gripper for picking atypical objects having various shapes, sizes, and materials.

BACKGROUND

Robots are widely used to perform various tasks such as welding, assembling, painting, and the like in industrial manufacturing sites. Further, robot utilization fields of robots are gradually expanding across all industries and service fields including a personal service field providing services in the surroundings of human life, and a professional service field providing specialized services such as medical care and the like.

Particularly, in recent years, with the rapid growth in a logistics market, it has become very important to increase a processing speed through automation of logistics, and in order to meet such a need, development of a picking robot for picking up cargo and a transfer robot for transferring cargo is actively underway.

In the picking robot among such robots, a gripper is necessarily required to pick up atypical objects, i.e., objects having various shapes, sizes, and materials, in order to implement automation of logistics.

The gripper includes a mechanical gripper capable of mechanically picking up an object by having a plurality of fingers driven by a hydraulic pressure or a pneumatic pressure, and a vacuum gripper capable of picking up an object by generating a vacuum on an interface between the vacuum gripper and the object. Further known is an electroadhesive gripper for picking up an object using an electrostatic force generated when an electric current flows through a conductor.

However, the mechanical gripper and the vacuum gripper have limitations in picking up objects of various sizes and shapes with an appropriate so as not to damage the objects, and thus the mechanical gripper and the vacuum gripper are not effective for picking up atypical objects. Further, a conventional electroadhesive gripper has a limitation in picking up the atypical objects, since in order to pick up a heavy object, the conventional electroadhesive gripper should have a large contact area and a large voltage should be applied thereto.

Therefore, it is required to develop a gripper capable of picking up atypical objects.

SUMMARY OF THE INVENTION

The present disclosure is directed to providing a shape compliant electroadhesive gripper capable of picking up an atypical object with a simplified structure and an easy mechanism while overcoming a limitation of the existing gripper.

The present disclosure is also directed to providing a shape compliant electroadhesive gripper capable of efficiently gripping and safely moving an atypical object.

According to an aspect of the present disclosure, there is provided a shape compliant electroadhesive gripper for picking up an atypical object, the shape compliant electroadhesive gripper comprising a body, and an electroadhesive module disposed on the body and including an electrorheological elastomer, wherein, when a voltage is not applied, a shape of the electroadhesive module is deformed according to a shape of an external object coming into contact with the electroadhesive module, and when the voltage is applied, rigidity of the electrorheological elastomer is increased to maintain the shape of the electroadhesive module, and when the voltage is applied to the electroadhesive module, electroadhesion is made due to an electrostatic force generated between the electrorheological elastomer and the adjacent external object.

The electrorheological elastomer of the electroadhesive module may comprise a dielectric material responsive to an electric field, and the dielectric material may contain an inorganic material. The inorganic material contained in the dielectric material may comprise one among $BaTiO_3$, $SrTiO_3$, and $TiO_2$.

The body may comprise a flexible film with an opening and a port connected to the opening of the flexible film and configured to be capable of injecting or discharging air into or from an interior of the flexible film, and a shape of the body may be capable of being controlled in a flexible film expansion or contraction manner by injecting or discharging the air into or from the interior of the flexible film.

The flexible film may comprise one among an elastomeric material, silicone, ethylene propylene rubber, and polydimethylsiloxane.

The flexible film may comprise one among an elastomeric material, silicon, ethylene propylene rubber, and polydimethylsiloxane.

The electroadhesive module may be disposed in a form of surrounding the flexible film.

The body may comprise a plurality of fingers, and the electroadhesive module may be disposed on each of the plurality of fingers.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be fully described in a detail which is suitable for implementation by those skilled in the art to which the present disclosure pertains with reference to the accompanying drawings.

In order to clearly describe the present disclosure, a description of a portion not related to the present disclosure will be omitted, and throughout this disclosure, like reference numerals will be assigned to like components.

When one component is herein referred to as being "above" other component, this includes a case in which the one component is located "immediately above" the other component as well as a case in which another component is present between the one component and the other component, and a connection of two components means that the two components are connected by being in direct contact with each other as well as these components are connected through another component.

Further, a size, a thickness, a position, and the like of each component shown in the drawings are arbitrarily illustrated for convenience of description, and thus the present disclosure is not necessarily limited to those shown in the drawings. That is, it should be noted that specific shapes, structures, and features described herein can be changed and implemented from one embodiment to another embodiment without departing from the spirit and scope of the present disclosure, and a position or an arrangement of each component can also be changed without departing from the spirit and scope of the present disclosure.

Accordingly, the following detailed description is not to be taken in a limiting sense, and the scope of the present disclosure should be construed to include the scope of the appended claims and equivalents thereof.

Figure 1:
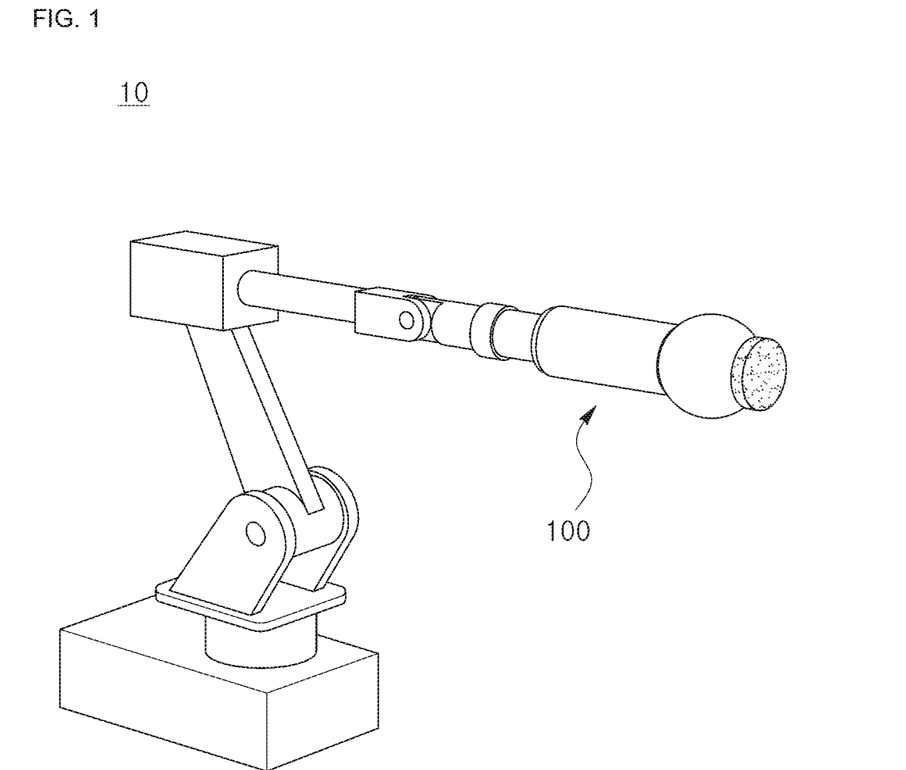
FIG. 1 is a diagram illustrating a robot having a shape compliant electroadhesive gripper according to a first embodiment of the present disclosure.
Figure 2:
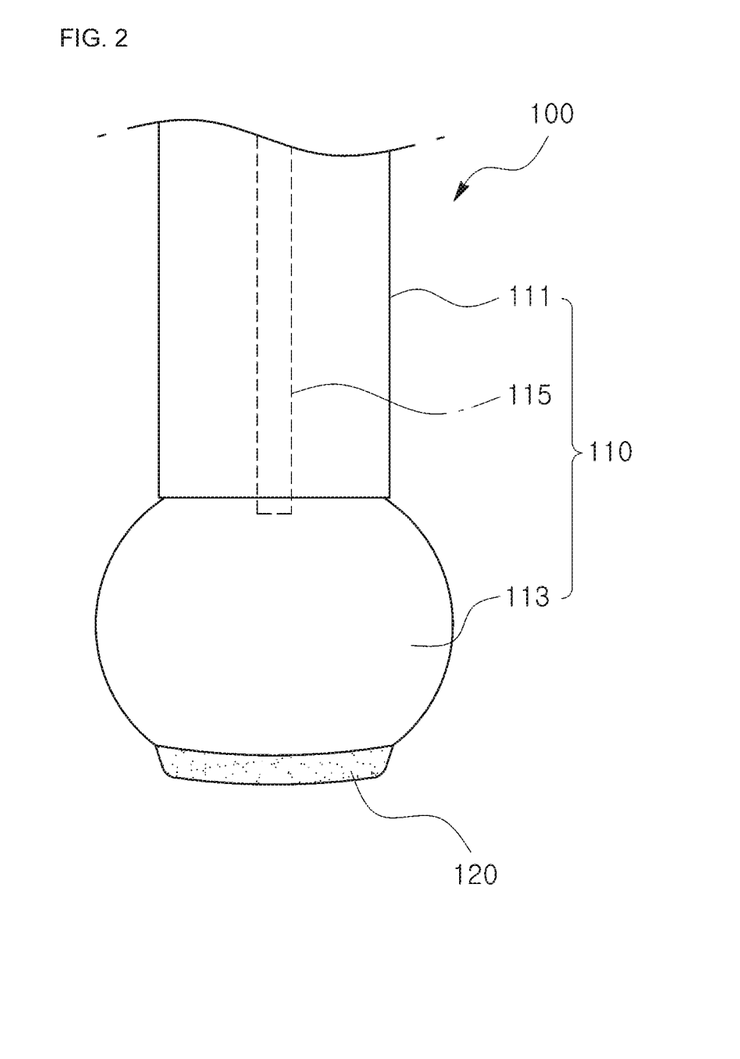
FIG. 2 is a diagram illustrating the shape compliant electroadhesive gripper according to the first embodiment of the present disclosure.

FIG. 1 is a diagram illustrating a robot having a shape compliant electroadhesive gripper according to a first embodiment of the present disclosure, and FIG. 2 is a diagram illustrating the shape compliant electroadhesive gripper according to the first embodiment of the present disclosure.

Referring first to FIG. 1, a shape compliant electroadhesive gripper 100 according to the first embodiment of the present disclosure is an end effector of a robot 10 and may be used to pick target objects of various sizes, shapes, and materials. The shape compliant electroadhesive gripper 100 may be connected to an arm of the robot 10 to pick up a target object and move the picked target object to a desired position. To this end, the shape compliant electroadhesive gripper 100 may move translationally and rotationally.

Referring to FIG. 2, the shape compliant electroadhesive gripper 100 according to the first embodiment of the present disclosure includes a body 110 and an electroadhesive module 120.

The body 110 of the shape compliant electroadhesive gripper 100 includes a base 111, a flexible film 113, and a port 115.

One end of the base 111 of the body 110 may be connected to the arm of the robot 10 to move according to driving of the arm. Further, the flexible film 113 is disposed at the other end of the base 111, and the port 115 connected to an interior of the flexible film 113 is installed inside the base 111.

The flexible film 113 of the body 110 is in the form of an empty air bag. As described below, the flexible film 113 may be connected to the port 115 and may be deformed by expanding or contracting while air is injected into the interior of the flexible film 113 or is discharged therefrom. That is, the flexible film 113 has a sealed shape except for a connection portion of the flexible film 113 to the port 115, and rigidity of the flexible film 113 may be varied due to injection or discharge of air.

The shape of the flexible film 113 may be varied according to a shape of an external target object which comes into contact with the flexible film 113. To this end, the flexible film 113 may be made of one flexible material among an elastomeric material, silicone, polydimethylsiloxane (PDMS), and ethylene propylene rubber. However, the present disclosure is not limited thereto, and the flexible film 113 may be made of other known materials with resistance to tearing and some amount of adhesion and friction of a film surface, such as polyethylene terephthalate (PET), latex, coated cloth, and the like.

The port 115 of the body 110 is installed inside the base 111 and one end of the port 115 is connected to the flexible film 113 to serve to inject air into the flexible film 113 or to discharge air therefrom. To this end, the port 115 may be connected to an air supply source (not shown) and an air supply controller (not shown).

The rigidity of the flexible film 113 may be varied by injecting air into the flexible film 113 or discharging air therefrom such that the flexible film 113 may be deformed in compliance with a shape of a target object and the deformed shape may be fixed thereafter. Specifically, when the shape compliant electroadhesive gripper 100 comes into contact with the target object, the flexible film 113 is deformed in compliance with a shape of the target object. In such a state, if air is discharged from the flexible film 113, then rigidity of the flexible film 113 increases such that the deformed shape of the flexible film 113 is maintained. Thus, as described below, when the target object is picked up and moved by the shape compliant electroadhesive gripper 100, the flexible film 113 may serve to surround and grip around the target object.

Meanwhile, in the first embodiment of the present disclosure, the interior of the flexible film 113 has been described as being filled with air, but the interior of the flexible film 113 may be filled with a filling material such as small grains. Small grains for filling the interior of the flexible film 113 may employ particles of small grains regardless of kinds of materials such as plastic particles, polymer particles, metal particles, powdered glass, powdered rubber, sand, sawdust, rice, and a coffee powder.

The electroadhesive module 120 of the shape compliant electroadhesive gripper 100 is disposed at one end of the body 110 and is deformed in shape in compliance with a shape of the target object. Further, the electroadhesive module 120 serves to attach the target object in the manner of an electroadhesion. To this end, the electroadhesive module 120 according to the present embodiment includes an electrorheological elastomer.

The electrorheological elastomer of the electroadhesive module 120 includes a polarizable dielectric material inside an elastomeric material. Characteristics of the electrorheological elastomer, such as rigidity and the like, may be varied due to application of an external electric field. The electrorheological elastomer of the electroadhesive module 120 according to the present embodiment has a shape in which a dielectric material is dispersed in a polymer material such as natural rubber or silicone, and the dielectric material includes an inorganic material. The inorganic material contained in the dielectric material employs any one among $BaTiO_3$, $SrTiO_3$, and $TiO_2$, but the present disclosure is not limited thereto. Owing to the above-described characteristics of the electrorheological elastomer, the electroadhesive module 120 according to the present embodiment usually has flexibility and when an electric field is applied, variations such as increase in rigidity and tensile strength occur in the electroadhesive module 120.

Consequently, when the electroadhesive module 120 according to the present embodiment comes into contact with the target object in a state in which an electric field is not applied, the electroadhesive module 120 is deformed in compliance with a shape of the target object, and then when the electric field is applied, the electroadhesive module 120 may maintain the deformed shape, i.e., a shape in compliance with the shape of the target object.

Meanwhile, the electroadhesive module 120 may be adhesive to the target object using an electrostatic force occurring between the electroadhesive module 120 and the target object. As described above, the electroadhesive module 120 is formed of an electrorheological elastomer in which a dielectric material is dispersed in an insulator such as a polymer. Consequently, when an electric field is applied to the electrorheological elastomer, an opposite polarity is induced on a surface of the target object adjacent to the electrorheological elastomer such that the electrostatic force occurs between the electroadhesive module 120 and the target object and thus electroadhesive module 120 and the target picking object are adhered.

The electroadhesive module 120 according to the first embodiment of the present disclosure further includes a controller (not shown) for varying rigidity of the electrorheological elastomer and generating electric adhesion due to the electrostatic force.

As described above, the electroadhesive module 120 according to the first embodiment of the present disclosure is made of an electrorheological elastomer and thus rigidity of the electroadhesive module 120 may be varied according to application of an electric field, and at the same time, adhesion (electric adhesion) may be generated due to generation of an electrostatic force between the electroadhesive module 120 and an adjacent object such that objects of various shapes can be picked up using the adhesion.

FIGS. 3A through 3D are diagrams illustrating a case in which the shape compliant electroadhesive gripper according to the first embodiment of the present disclosure operates. The process in which the shape compliant electroadhesive gripper 100 according to the first embodiment of the present disclosure grips the target object using the characteristic of the electroadhesive module 120 will be sequentially described below.

Figure 3A:
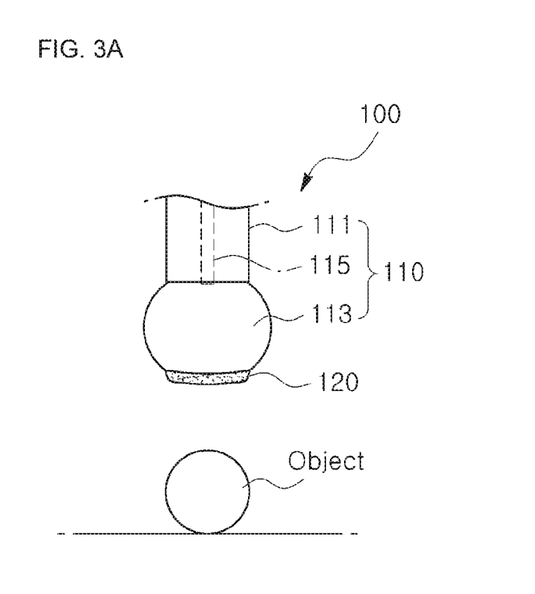
FIG. 3A is a diagram illustrating a case in which the shape compliant electroadhesive gripper according to the first embodiment of the present disclosure operates.

First, the shape compliant electroadhesive gripper 100 is moved adjacent to the target object (see FIG. 3A). The movement of the shape compliant electroadhesive gripper 100 may be achieved through control of the arm of the robot.

Figure 3B:
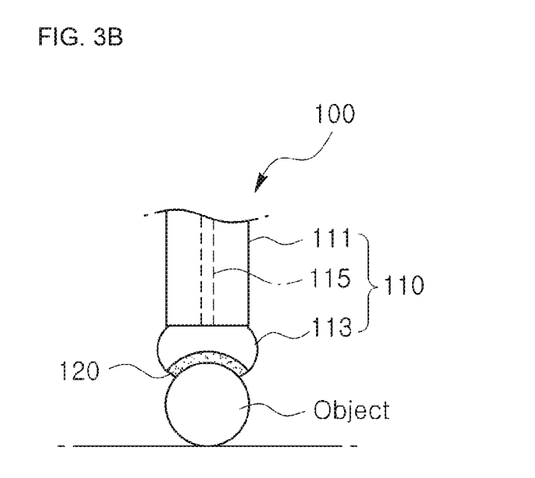
FIG. 3B is a diagram illustrating a case in which the shape compliant electroadhesive gripper according to the first embodiment of the present disclosure operates.

Next, a surface of the shape compliant electroadhesive gripper 100 comes contact with a surface of the target object (see FIG. 3B). In this case, the flexible film 113 of the body 110 maintains a flexible state due to control of an internal air pressure in advance and thus when the shape compliant electroadhesive gripper 100 comes into contact with the target object, the flexible film 113 is deformed in compliance with an exterior shape of the target object. Further, since an electric field is not applied and thus the electroadhesive module 120 maintains in a flexible state in which rigidity is low, the electroadhesive module 120 is also deformed in compliance with the exterior shape of the target object.

Figure 3C:
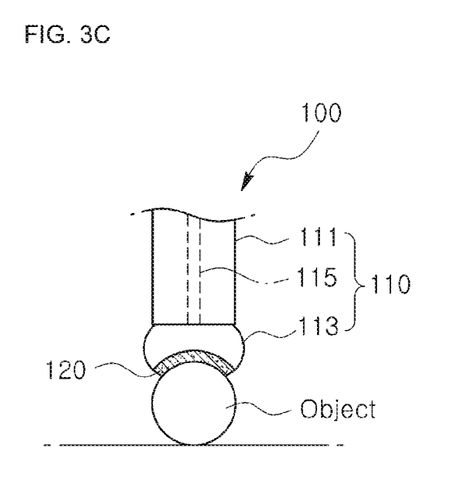
FIG. 3C is a diagram illustrating a case in which the shape compliant electroadhesive gripper according to the first embodiment of the present disclosure operates.

When the shape compliant electroadhesive gripper 100 comes into contact with the surface of the target object and thus the flexible film 113 of the body 110 and the electrorheological elastomer of the electroadhesive module 120 are deformed in compliance with the exterior shape of the target object, the internal air pressure of the flexible film 113 of the body 110 is controlled and, simultaneously, a voltage is applied to the electrorheological elastomer of the module 120 (see FIG. 3C). Consequently, the rigidity of each of the flexible film 113 and the electrorheological elastomer increases such that the deformed state in compliance with the exterior shape of the target object is maintained. For example, as shown in FIG. 3C, when the target object has a spherical shape, the flexible film 113 and the electrorheological elastomer are bent and deformed into concaves shape in compliance with the sphere shape and then are remained in the deformed state.

Further, as a voltage is applied to the electrorheological elastomer of the electroadhesive module 120, a surface of the target object adjacent to the electroadhesive module 120 is charged due to polarization of the dielectric material inside the electrorheological elastomer such that electroadhesion due to an electrostatic force is made between the electroadhesive module 120 and the target object.

Figure 3D:
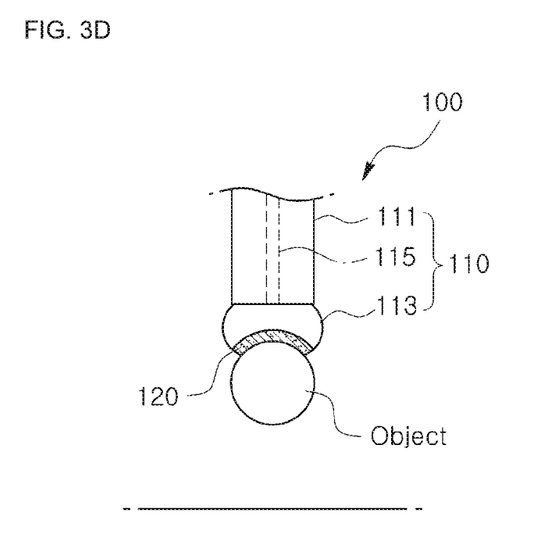
FIG. 3D is a diagram illustrating a case in which the shape compliant electroadhesive gripper according to the first embodiment of the present disclosure operates.

As described above, in a state in which the deformed shapes of the flexible film 113 of the body 110 and the electroadhesive module 120 are maintained and the electroadhesion is made between the electroadhesive module 120 and the target object, when the compliant electroadhesive gripper 100 is moved, the target object is moved in a state of being adhered to the compliant electroadhesive gripper 100 (see FIG. 3D). During the above-described process, the flexible film 113 of the body 110 and the electrorheological elastomer of the electroadhesive module 120 are maintained in the deformed state in compliance with the shape of the target object such that a contact area between the electroadhesive module 120 and the target object may be increased to enhance the electroadhesion as well as the target object may be firmly surrounded and supported. That is, in addition to the electroadhesion, the target object may be effectively picked up by a mechanical gripping force such that the target object may be stably gripped and safely moved to a position desired by a user.

After the target object is moved to the desired position, the target object may be put down by reversely performing the above-described process. Specifically, after the target object is moved to the desired position, the voltage applied to the electrorheological elastomer of the electroadhesive module 120 is released and the internal air pressure of the flexible film 113 of the body 110 returns to its original state, and then the shape compliant electroadhesive gripper 100 is separated from the target object.

Meanwhile, in a case in which the target object is moved using electroadhesion, when the target object is moved to a desired position and then application of a voltage is released, it may take some time for completely removing the electroadhesion such that there occurs a problem in that a total movement time is delayed. However, according to the present embodiment, when the target object is detached, the deformed shapes of the electrorheological elastomer of the flexible film 113 and the electroadhesive module 120 of the body 110 are restored, and a restoring force aids in detaching of the target object from the electroadhesive module 120 such that it is possible to reduce a detachment time of the target object and increase overall movement efficiency.

As described above, the shape compliant electroadhesive gripper 100 according to the first embodiment of the present disclosure may effectively pick up and move the target object with a simplified structure and an easy mechanism.

Specifically, the shape compliant electroadhesive gripper 100 according to the first embodiment of the present disclosure includes the body 110 including the flexible film 113 and the electroadhesive module 120 including the electrorheological elastomer and thus the exterior shape of the compliant electroadhesive gripper 100 is deformed in compliance with the shape of the target object and, at the same time, electroadhesion generated during the deformation is used such that the shape compliant electroadhesive gripper 100 may grip objects having various sizes and shapes. In particular, the shape adaptation characteristics of the flexible film 113 of the body 110 and the electrorheological elastomer of the electroadhesive module 120 are utilized such that when the shape compliant electroadhesive gripper 100 comes into contact with the target object, the target object may be firmly and stably surrounded and supported while enhancing the electroadhesion. Further, even when the target object is detached from the shape compliant electroadhesive gripper 100, a detachment speed may be increased by the restoring forces of the flexible film 113 of the body 110 and the electrorheological elastomer of the electroadhesive module 120.

In the above-described embodiment, the electroadhesive module 120 has been described as being installed at one end of the flexible film 113 of the body 110, but the electroadhesive module 120 may be installed in a different form.

Figure 4:
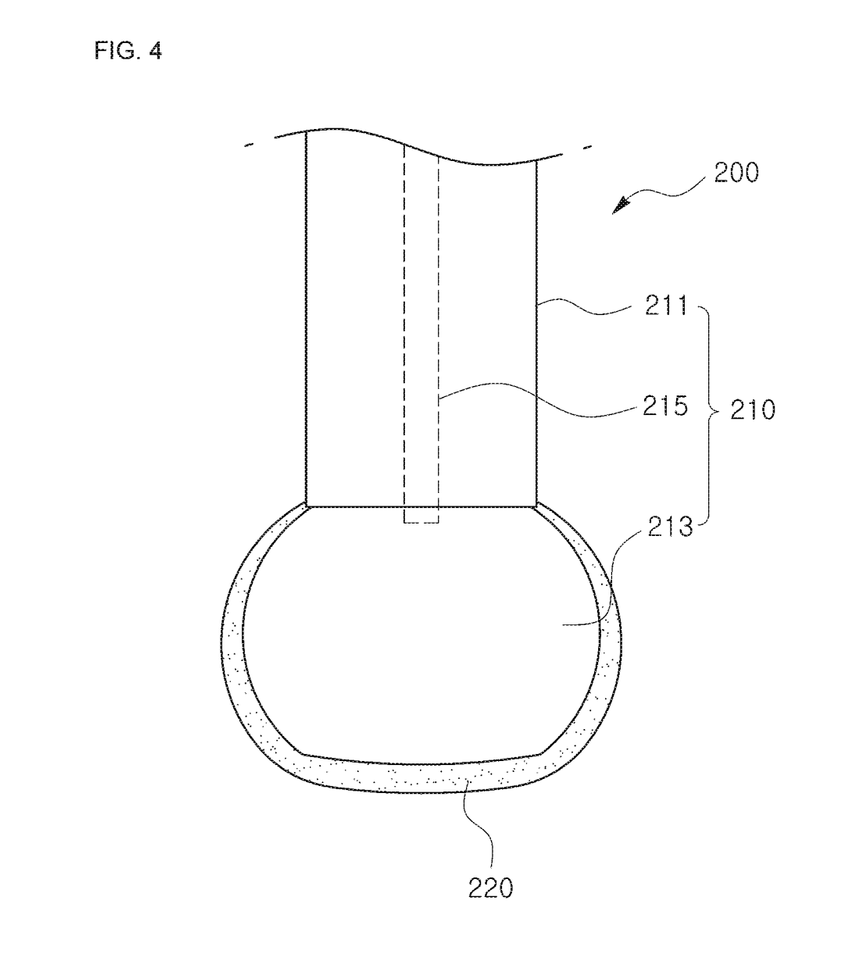
FIG. 4 is a diagram illustrating a shape compliant electroadhesive gripper according to a second embodiment of the present disclosure.

FIG. 4 is a diagram illustrating a shape compliant electroadhesive gripper according to a second embodiment of the present disclosure. Referring to FIG. 4, a shape compliant electroadhesive gripper 200 according to the present embodiment has a structure similar to that of the shape compliant electroadhesive gripper 100 according to the first embodiment. That is, the shape compliant electroadhesive gripper 200 includes a body 210 and an electroadhesive module 220, and the body 210 includes a base 211, a flexible film 213, and a port 215. However, the shape compliant electroadhesive gripper 200 according to the present embodiment differs from the first embodiment in that the electroadhesive module 220 entirely surrounds the flexible film 213.

In the shape compliant electroadhesive gripper 200 according to the second embodiment of the present disclosure, the electroadhesive module 220 including the electrorheological elastomer is installed on the body 210 including the flexible film 213 and thus an exterior shape of the shape compliant electroadhesive gripper 200 is deformed in compliance with a shape of a target object and, at the same time, electroadhesion generated during the deformation is used such that the shape compliant electroadhesive gripper 200 may grip objects having various sizes and shapes.

Further, according to the present embodiment, an area of the electroadhesive module 220 coming into contact with the target object may be further increased and thus adhesion with the target object may be further improved such that the shape compliant electroadhesive gripper 200 may stably pick up the target object.

Meanwhile, in the above-described embodiments, the body of the shape compliant electroadhesive gripper is in the form of a spherical shape made of a flexible film. However, the shape compliant electroadhesive gripper may be formed of a multiple finger type gripper with a plurality of bodies.

Figure 5:
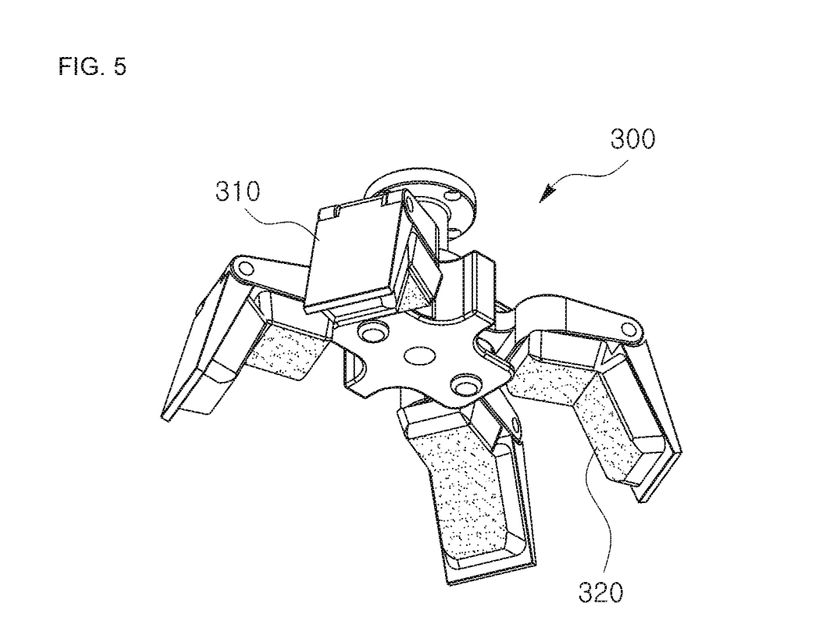
FIG. 5 is a diagram illustrating a shape compliant electroadhesive gripper according a third embodiment of the present disclosure.

FIG. 5 is a diagram illustrating a shape compliant electroadhesive gripper according to a third embodiment of the present disclosure. Referring to FIG. 5, the shape compliant electroadhesive gripper 300 according to the present embodiment includes a plurality of bodies 310 in the form of a finger and an electroadhesive module 320 installed on each of the plurality of bodies 310.

The electroadhesive module 320 according to the present embodiment is disposed on the plurality of bodies 310. As in the above-described embodiments, the electroadhesive module 320 may be formed of an electrorheological elastomer in which a dielectric material is dispersed in an insulator like a polymer such that when an electric field is applied, adhesion may be made through an electrostatic force generated between the electroadhesive module 320 and a surface of a target object.

The plurality of bodies 310 may be connected to a shaft connected to the arm of the robot so that movements thereof may be controlled. For example, the plurality of bodies 310 may be rotationally driven about a common axis through a body driver (not shown). Alternatively, each of the plurality of bodies 310 may have a joint part to be driven in a folded manner in a direction in which the electroadhesive module 320 is disposed. As described above, according to the present embodiment, the body 310 of the shape compliant electroadhesive gripper 300 may be rotated and bent, thereby corresponding to objects having various shapes and sizes.

Figure 6:
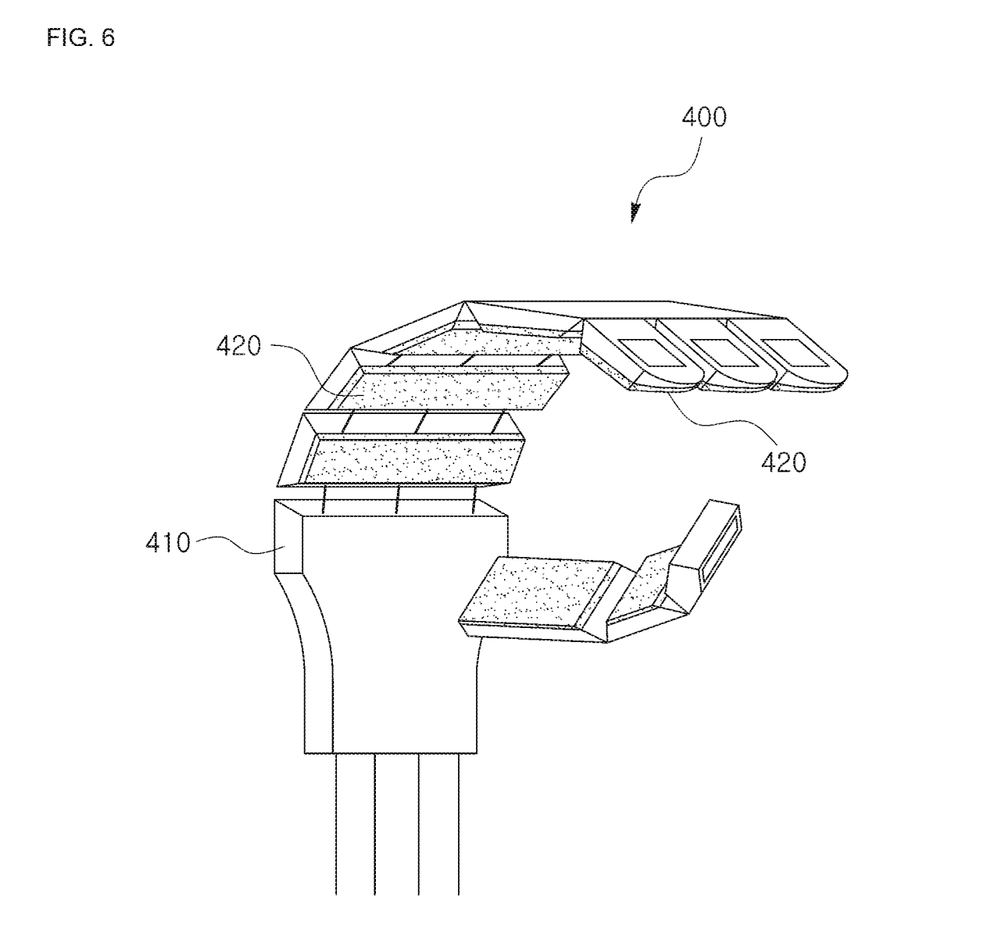
FIG. 6 is a diagram illustrating a shape compliant electroadhesive gripper according to a fourth embodiment of the present disclosure.

FIG. 6 is a diagram illustrating a shape compliant electroadhesive gripper according to a fourth embodiment of the present disclosure. Referring to FIG. 6, a shape compliant electroadhesive gripper 400 according to the present embodiment also includes an electroadhesive module 420 disposed on a plurality of bodies 410. In particular, the shape compliant electroadhesive gripper 400 according to the present embodiment has a shape similar to that of a human hand and may pick up a target object with a form similar to that of a human hand.

As described above, each of the plurality of bodies 410 serves as a palm and a finger, and rotation and bending movements of the respective fingers are controlled through a separate driver (not shown) such that various shapes of target objects may be surrounded and, in this state, electroadhesion is generated through the electroadhesive module 420 to stably pick up the target objects.

According to one embodiment of the present disclosure, an electroadhesive module is formed of an electrorheological elastomer such that deformation can be made in compliance with a shape of a target object and, simultaneously, electroadhesion can be generated to grip an atypical object with a simplified structure and an easy mechanism.

Further, the electrorheological elastomer of the electroadhesive module and a flexible film of a body may be deformed in compliance with an exterior shape of the target and then may be fixed to the deformed state such that the atypical object can be efficiently gripped and safely moved.

While the present disclosure has been described with reference to specific items such as particular components and exemplary embodiments, these embodiment are merely provided to help understanding the present disclosure, and the present disclosure is not limited to these embodiments, and those skilled in the art to which the present disclosure pertains can variously alter and modify from the exemplary embodiments of the present disclosure.

Therefore, the spirit of the present disclosure should not be limited to the above-described embodiments, and it should be construed that the appended claims as well as all equivalents or equivalent modifications of the appended claims will fall within the scope of the present disclosure.

What is claimed is:

1. A shape compliant electroadhesive gripper for picking up an atypical object, the shape compliant electroadhesive gripper comprising:
    a body; and
    an electroadhesive module disposed on the body and comprising an electrorheological elastomer,
    wherein the body comprises a flexible film having an opening and a port connected to the opening of the flexible film and configured to be capable of injecting or discharging air into or from an interior of the flexible film, and
    the flexible film has a sealed shape except for a connection portion of the flexible film to the port, and rigidity of the flexible film is varied by injecting or discharging the air into or from the interior of the flexible film,
    wherein, when the air is injected into the interior of the flexible film, a shape of the flexible film is deformed according to the shape of an external object coming into contact with the electroadhesive module, and
    when the air is discharged from the interior of the flexible film, the rigidity of the flexible film is increased to maintain the shape of the flexible film, and
    wherein, when a voltage is not applied, a shape of the electroadhesive module is deformed according to a shape of the external object coming into contact with the electroadhesive module, and
    when the voltage is applied to the electroadhesive module, rigidity of the electrorheological elastomer is increased to maintain the shape of the electroadhesive module, and at the same time,
    electroadhesion is made due to an electrostatic force generated between the electrorheological elastomer and the external object adjacent to the electrorheological elastomer.

2. The shape compliant electroadhesive gripper of claim 1, wherein the electrorheological elastomer of the electroadhesive module comprises a dielectric material responsive to an electric field, and the dielectric material contains an inorganic material.

3. The shape compliant electroadhesive gripper of claim 2, wherein the inorganic material contained in the dielectric material comprises one among $BaTiO_3$, $SrTiO_3$, and $TiO_2$.

4. The shape compliant electroadhesive gripper of claim 1, wherein the flexible film comprises one among an elastomeric material, silicone, ethylene propylene rubber, and polydimethylsiloxane.

5. The shape compliant electroadhesive gripper of claim 1, wherein the electroadhesive module is disposed at one end of the flexible film.

6. The shape compliant electroadhesive gripper of claim 1, wherein the electroadhesive module is disposed in a form of surrounding the flexible film.

* * * * *